United States Patent
Beck et al.

(10) Patent No.: US 7,164,507 B2
(45) Date of Patent: Jan. 16, 2007

(54) IMAGE INPUT TERMINAL

(75) Inventors: Richard A. Beck, Fairport, NY (US);
Gerald R. Curry, Lima, NY (US);
Donald J. Lyon, Macedon, NY (US)

(73) Assignee: Xerox Corporation, Stamford, CT (US)

(*) Notice: Subject to any disclaimer, the term of this patent is extended or adjusted under 35 U.S.C. 154(b) by 921 days.

(21) Appl. No.: 10/280,976

(22) Filed: Oct. 25, 2002

(65) Prior Publication Data
US 2004/0080791 A1 Apr. 29, 2004

(51) Int. Cl.
H04N 1/04 (2006.01)

(52) U.S. Cl. ............... 358/474; 358/498; 358/487; 358/471; 355/230; 271/227

(58) Field of Classification Search ............ 358/474, 358/498, 497, 496, 487, 488, 471; 355/230; 271/227
See application file for complete search history.

(56) References Cited

U.S. PATENT DOCUMENTS

| | | | | |
|---|---|---|---|---|
| 4,429,333 A * | 1/1984 | Davis et al. | ............... | 358/496 |
| 4,461,681 A | 7/1984 | Barber | ............... | 358/474 |
| 4,536,077 A | 8/1985 | Stoffel | ............... | 358/497 |
| 4,574,316 A | 3/1986 | Wilman et al. | ............... | 358/498 |
| 4,580,172 A * | 4/1986 | Rajagopal | ............... | 358/451 |
| 4,583,127 A * | 4/1986 | Kurata et al. | ............... | 358/1.2 |
| 4,605,970 A | 8/1986 | Hawkins | ............... | 358/461 |
| 4,616,269 A * | 10/1986 | Mori | ............... | 358/496 |
| 4,666,287 A * | 5/1987 | Malyon | ............... | 399/118 |
| 4,706,125 A | 11/1987 | Takagi | ............... | 358/474 |
| 4,806,977 A | 2/1989 | Mizutani et al. | ............... | 358/496 |
| 4,933,778 A * | 6/1990 | Tufano et al. | ............... | 358/488 |
| 4,967,233 A * | 10/1990 | Buchar et al. | ............... | 358/496 |
| 5,091,654 A | 2/1992 | Coy et al. | ............... | 358/283 |
| 5,280,368 A * | 1/1994 | Fullerton | ............... | 358/474 |
| 5,513,017 A * | 4/1996 | Knodt et al. | ............... | 358/471 |
| 5,680,204 A | 10/1997 | Ferrara | ............... | 358/296 |
| 6,166,394 A * | 12/2000 | Rubscha | ............... | 250/559.42 |

OTHER PUBLICATIONS

Xerox Disclosure Document: Richard E Smith; Automatic Duplex Document Electronic Scanning.

* cited by examiner

Primary Examiner—Douglas Q. Tran
Assistant Examiner—Negussie Worku

(57) ABSTRACT

An imaging system, which may be applied both to black and white and color imaging systems and comprising a platen member which defines an imaging portion and a calibration portion is disclosed. The imaging portion and the calibration portion comprise separate portions of the platen member. The platen member is supported by a movably mounted support member, and moves with the support member between a platen member calibrating position and a platen member imaging position. The platen member is dimensioned to support a sheet to be imaged. An imaging module with an imaging zone is supported in a position where the imaging zone is positioned to coincide with a portion of a sheet supported on the imaging portion of the platen member, when the platen member is in the platen member imaging position. A calibration member having a reference reflectivity is adhered to the calibration portion of the platen member. The imaging zone coincides with the calibration member, when the platen member is in the calibrating position. The calibration member lies substantially outside the imaging zone of the imaging module, when the platen member is in the platen member imaging position. A motor moves the support member between the calibrating position and the imaging position to allow performance of a calibration procedure on the imaging module.

18 Claims, 11 Drawing Sheets

IMAGE INPUT TERMINAL

BACKGROUND

1. Field of the Invention

This invention relates to intensity calibration targets and methods employed in imaging systems, which targets and methods are particularly useful in systems having a plurality, such as a pair of imaging arrays for scanning both sides of a document.

2. References

Acquisition of color, black and white, and shades of gray image information, adaptable for generating copies or electronic processing directly from printed original documents, has become greatly desirable as an adjunct to electronic document generation. An important reason for this desirability is the subsequent capability of manipulation of the electronically stored information for editing, compiling and using the information in forms other than those in which it was originally available. While such manipulation is, available for image information produced originally or otherwise available in an electronic format, it is desirable to have a similar capability for image information not so available. Accordingly, it is desirable to have automated image information input capability, which, coupled with available output devices, renders possible functions such as simplex and duplex copying, image rotation, cropping, editing, and the like, without the requirement of troublesome mechanical manipulation of originals and copies.

A number of document handling systems utilize image input devices for such purposes as archiving, printing and transmitting images. Typical applications include facsimile transmission, document reproduction, digital copying, inputting images into a database, and optical character recognition. Specifically a number of known systems utilize a linear array of solid-state light detecting devices to generate an image, linear area by linear area, until the entire image of, for example, a side of a sheet of paper is acquired.

In such devices, constant velocity relative movement, between the linear array and the document to be imaged, allows the linear array to scan the face of the document. This is usually achieved in one of two ways. Either the linear detector array may be held stationary and the document moved at a constant velocity past the linear array, or, alternatively, the document may be held stationary and the linear array scanned across the face of the document, carried by a constant velocity transport.

Each of the elements in the linear array receives one pixel of intensity information from the corresponding part of the image in the form of light from an illumination lamp reflected by that part of the image, and focused by an appropriate lens structure. In response, each of the elements outputs an electrical signal whose magnitude is indicative of the intensity of light falling on the element.

A primary problem associated with electronic input scanners is a periodic requirement for calibration of the sensor arrangement and its electronics and related optical imaging components. Because a large number of photosensitive elements comprise the scanning array, uniformity of response is of value for acceptable imaging quality.

The problem thus arises to determine what level of electrical output signal corresponds to white and black image portions. Black signal levels may be measured by simply turning the illumination lamp off. If the level of electrical output signal corresponding to a white image portion was always the same, the problem of determining what level of electrical output signal corresponds to a white image portion would be relatively simple to solve, by simply hard wiring a circuit which provides the desired response. However, a white image portion may cause a photodetector to emit a wide range of output voltages, depending upon numerous factors, such as ambient light, line voltage variations, pixel to pixel variations in the detector array, lamp age and manufacturing variations, optics, dirt, and other factors. Frequent calibration is required against a target having a known reflectance value.

In U.S. Pat. No. 5,280,368 to Fullerton, there is disclosed a dual purpose calibration/baffle member, which in a first position serves as a paper baffle along the sheet feeding path to the scanning station to support sheets at a first scanning element, and in a second position, supports a calibration target at a position for detection by the first scanning element. The calibration/baffle member is mounted on the input scanner frame for movement between the first and second positions. The baffle member is guided with pivoting movement for the purpose of calibration to a position where a calibration target is within the field of view of the fixed scanning element.

In U.S. Pat. No. 4,429,333 to Davis, a calibration strip cut from a sheet of ethylene propylene or other uniformly white material is disclosed. The calibration strip is pressed against the platen glass on the same side as the document. Prior to commencement of scanning, a dark calibration reference is established by scanning with the illumination off. Next, the illumination is turned on, and the scanner carriage is driven to a calibration position where the scanner views the calibration strip. At that time, the scanner is calibrated to produce output signals based on the known reflectivity of the calibration strip.

In Buchar, U.S. Pat. No. 4,967,233, it is indicated that the scanning element is rotated out of the scanning position to view a calibration target. More particularly, the scanning element is rotated about an axis transverse to the direction of paper travel through the scanning station, and parallel to the paper path, with the axis through the scanning element.

U.S. Pat. No. 4,574,316 to Wilman et al. discloses a document scanner unit which rotates into at least one other scanning position to receive light reflected from a remote source.

U.S. Pat. No. 4,464,681 to Jacobs et al. discloses an optical scanning system comprising a linear photodiode array which can be adjusted in position to view an optical test pattern. U.S. Pat. No. 4,605,970 to Hawkins discloses a calibration arrangement which moves an optical scanning head assembly from a reference location into a testing position to view an optical test pattern. U.S. Pat. No. 4,706,125 to Takagi discloses an image reading device comprising an integrated image reading unit and an optical sensitivity checking member which concurrently translate in unison from an inoperative position into an operative position during the scanning of an original.

U.S. Pat. No. 4,806,977 to Mizutani et al. discloses a movable carriage housing for a scanning-type optic apparatus wherein a rack and pinion arrangement allows an upper body portion apparatus to pivot outwardly to expose a transfer station and scanning head for maintenance.

It is desirable to provide a scanning device for scanning duplex documents, for example, original documents having image information on both sides, for simplex documents having image information only on a single side, and for material not adaptable to be passed through sheet handling devices. In the past, this feature has been achieved in input scanners in a variety of ways, for example, there is disclosed in U.S. Pat. No. 4,536,077 to Stoffel, an arrangement provided with an optical system to direct light reflected from a first side of the document to a single scanning array, while the document is moving past a first position, and subsequently directing light from the second side of the document to the scanning array when it has reached a second position.

A disclosure entitled "Automatic Duplex Document Electronic Scanning" by Richard E. Smith, and published in the Xerox Disclosure Journal, Vol. 8, No. 3, May/June, 1983 at page 263, discloses both side scanning of a document with two spaced apart scanning arrays arranged on opposite sides of a document path, and platen scanning by a movable carriage supporting one of the arrays. All the patents and publications cited hereinabove are incorporated herein by reference.

Another solution to the calibration problem involves the reading of the intensity of light from a selected portion or portions of a white calibration target. In one arrangement the calibration target is on the same side of the platen glass as the document to be imaged. In accordance with the invention, it is noted that because contact between the calibration target and the glass may result in uneven intensity at one or more points, an air gap is introduced between the calibration target and the platen glass.

SUMMARY

In accordance with embodiments of the invention, a calibration target painted on the platen glass substantially avoids, or minimizes, the uneven intensity problem. For example, this problem may take the form of variations of apparent reflectivity of two to four percent. In accordance with the invention, this is done without introducing an air gap and associated contamination problems centering on introduction of airborne materials into parts of the system, such as the gap. These materials can cause calibration errors resulting in overexposure or underexposure.

More particularly, the inventive imaging system, which may be applied both to black and white and color imaging systems, comprises a platen member which defines an imaging portion and a calibration portion. In the preferred embodiment, the imaging portion and the calibration portion take up adjacent areas on the platen member. The platen member is supported by a movably mounted support member, and moves with the support member between a platen member calibrating position and a platen member imaging position. The platen member is dimensioned to support a sheet to be imaged. An imaging module with an imaging zone is supported in a position where the imaging zone is positioned to coincide with a portion of a document such as a sheet supported on the imaging portion of the platen member, when the platen member is in the platen member imaging position. A calibration member having a reference reflectivity is adhered to the calibration portion of the platen member. The calibration member lies substantially outside the imaging zone when the platen member is in the platen member imaging position. A motor moves the support member between the calibrating position and the imaging position to allow performance of a calibration procedure on the imaging module.

In accordance with an embodiment of the invention, the imaging module is disposed over the top surface of the platen member, to image the side of the sheet bearing against the bottom surface of the platen member and the calibration member is disposed over the bottom surface of the platen.

In accordance with an embodiment of the invention, the calibration member comprises an opaque paint on the bottom surface of the platen member covered by a layer of at least partially transparent film to prevent the paint from wearing as the document passes by the calibration member.

In accordance with the preferred embodiment, the movably mounted support member comprises a frame secured to the platen member. The frame is supported by a guide rail mechanism, comprising a pair of rails, for movement of the platen member between the platen member calibrating position and the platen member imaging position. Such movement is accomplished by a motor whose output shaft is mechanically coupled to the frame by a gear train comprising a rack gear and a pinion gear.

The inventive method of imaging sheets comprises moving, between a first imaging position and a second calibration position, the platen with a calibration element secured to the platen. The calibration element has been applied to the platen in a painting operation. The platen is moved to the calibration position prior to imaging and a calibration operation can be performed with the platen in the calibration position or preferably as the calibration element is moved past the imaging zone. An imaging array head images the calibration element during the calibration operation. After performance of the calibration operation, the platen is moved to the imaging position. After the platen is in the imaging position, sheets are advanced through the system to be imaged at a position where the sheets to be imaged are viewed by the imaging array head. In accordance with the preferred embodiment, the array head is held stationary during imaging and the sheets are transported by a constant velocity transport past the imaging array head, as the imaging array head is scanning the sheets.

BRIEF DESCRIPTION OF THE DRAWINGS

The invention will be described in detail with reference to the following drawings, wherein.

DETAILED DESCRIPTION OF THE INVENTION

Figure 1:
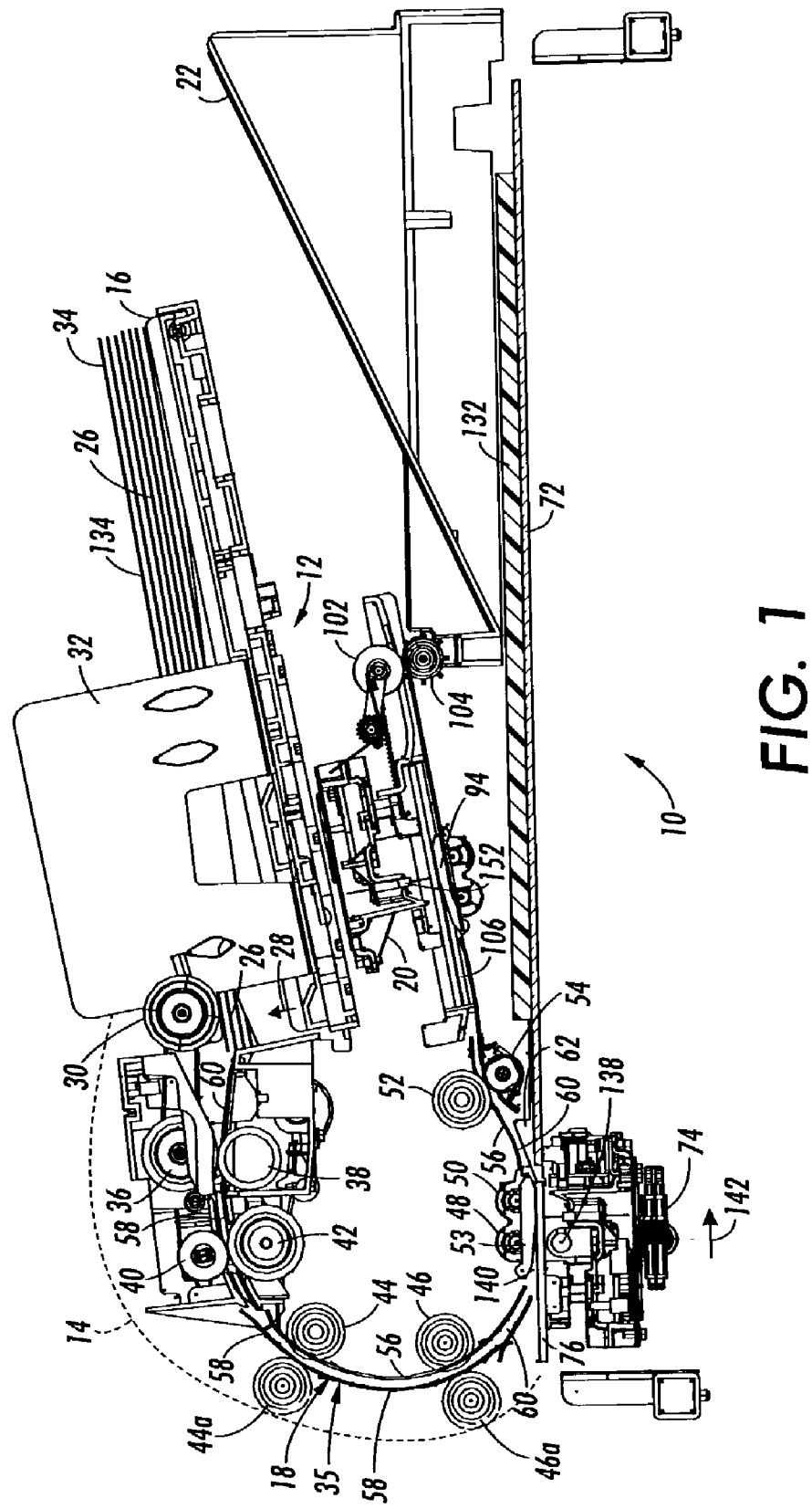
FIG. 1 is a schematic front view of an image input terminal constructed in accordance with the present invention.

An image input terminal 10, constructed in accordance with the present invention and comprising an automatic document handler 12, is illustrated in FIG. 1. Image input terminal 10 may be used for the input of black and white as well as color images. Document handler 12 is secured to the platen cover of terminal 10, which is, in turn, secured to a pivotally mounted frame assembly (not shown) which may employ conventional pivoting structure. Document handler 12 comprises a multiple sheet input tray 16, a paper feeder comprising a document feed roller 30, a cooperating transport roller 36 and a cooperating idler roller 38, a constant velocity transport 18, a side-two image module 20, and an output tray 22.

Figure 2:
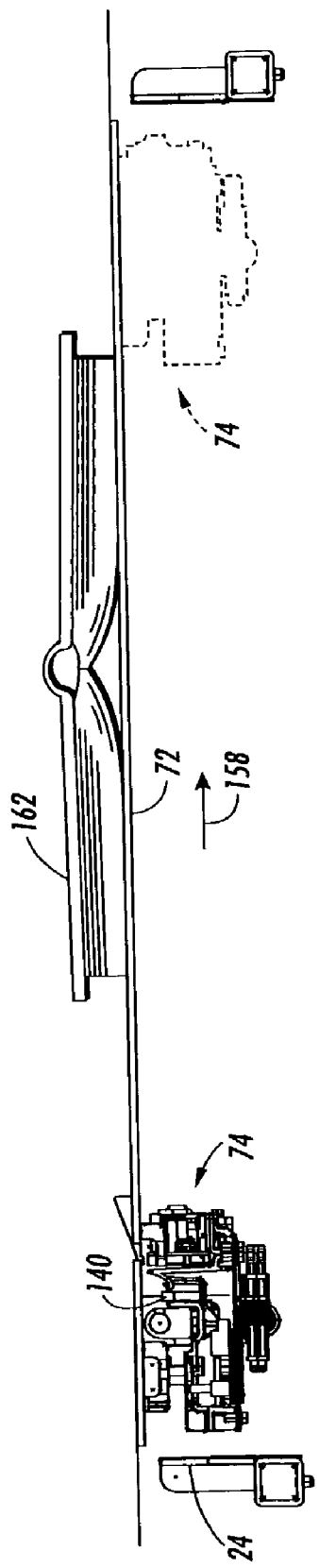
FIG. 2 is a schematic view of the inventive image input terminal in a position to input images of single sheets or books with the document handler not shown for clarity of illustration.

Image input terminal 10 also comprises a base 24. Platen cover 14, incorporating document handler 12, is pivotally mounted on the rear of the photocopier for movement between the cover down position illustrated in FIG. 1 and a raised cover position. FIG. 2 shows the use of terminal 10 to copy pages of a book in the raised cover position, with the document handler removed for clarity of illustration. Input tray 16 is adapted to receive a stack of sheets, such as two-sided paper documents 26, to be copied. The stack of documents 26 is driven upwardly in the direction of arrow 28, by a conventional motor and linkage assembly (not shown), toward and into engagement with a document feed roller 30. Documents 26 are maintained in position between a pair of paper guides 32, which engage opposite sides of documents 26.

The top sheet 34 in the stack of documents 26 is fed into the system by feed roller 30. Feed roller 30 is rotated to pull successive top sheets, starting with top sheet 34, into a baffle assembly 35. Baffle assembly 35 serves to guide the documents along the initial portion of a desired path as the documents advance, one by one, through the system. In baffle assembly 35, documents are engaged between cooperating transport roller 36 and cooperating idler roller 38 and advanced toward cooperating idler roller 40 and transport roller 42. Continued advancement of a sheet of paper taken from the stack of documents 26 is provided by transport rollers 44, 46, and cooperating rollers 44a and 46a. As a sheet advances through baffle assembly 35, it is accelerated to the speed of constant velocity rollers 48 and 50. Roller 52 cooperates with roller 54 to further advance the sheet of paper. Rollers 48 and 50 are contained within a drive on glass paper guide 53, which also performs the function of guiding the paper sheet being fed. Rollers 30 and 36–46 are mounted in a conventional manner at the positions indicated in FIG. 1.

Figure 3:
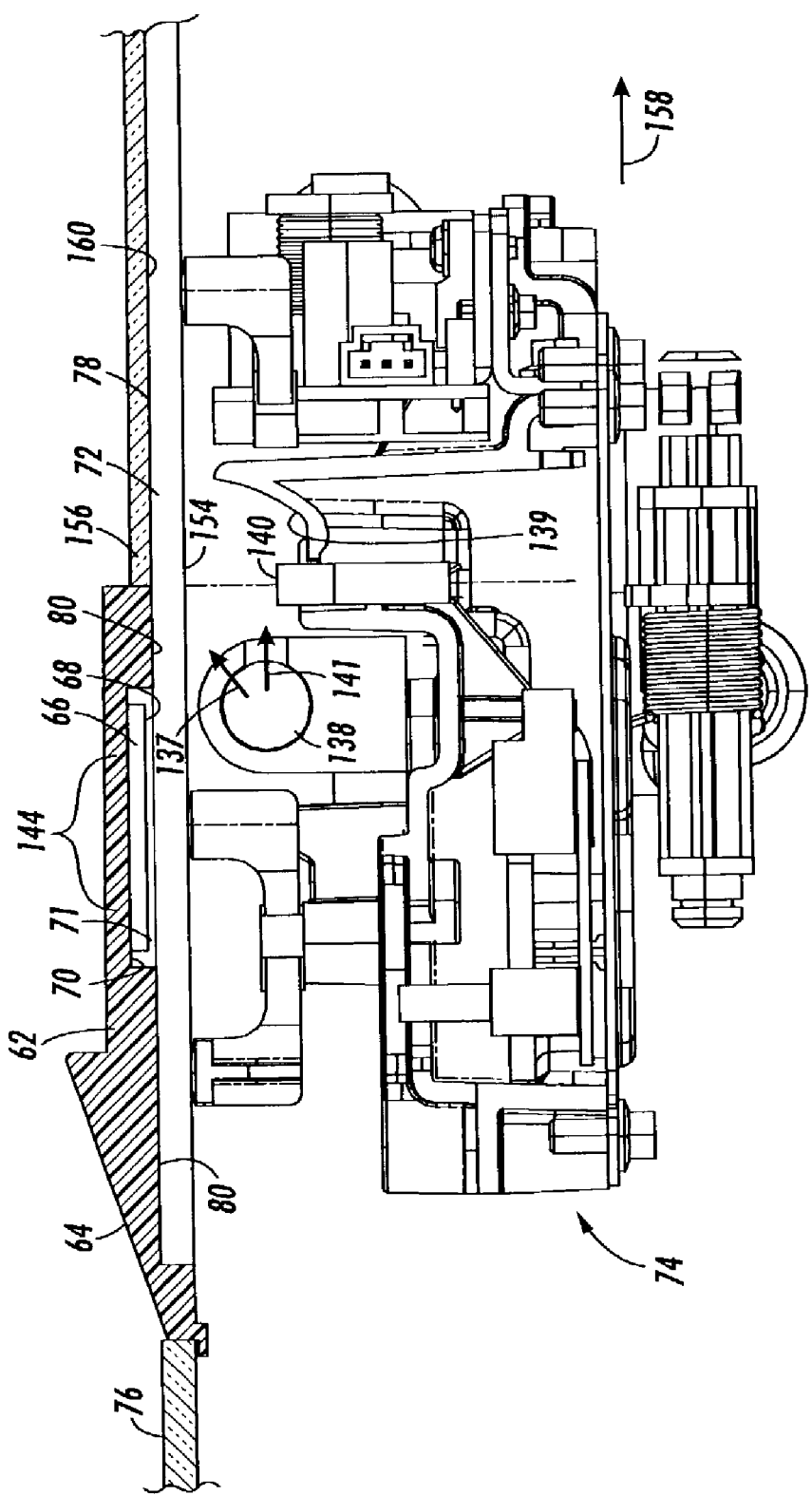
FIG. 3 is a detail, illustrating the side-one image capture module during fixed platen operation.

Rollers 52 and 54 are mounted as shown in FIG. 1 to receive sheets from baffle assembly 35. Transport rollers 30 and 36–54 are made of a rubber-like urethane while cooperating rollers are made of a hard plastic. The result is to effectively engage, grip and advance a sheet of paper guided by baffle assembly 35. Baffle assembly 35 comprises a radially inner guide assembly 56 and a radially outer guide assembly 58. A paper path 60 is defined between radially inner guide assembly 56 and radially outer guide assembly 58. Paper path 60 is also defined by registration frame 62 (FIG. 3). In particular, registration frame 62 includes an inclined guide surface 64 for guiding fed documents toward cooperating rollers 52 and 54.

Registration frame 62 also includes a calibration target 66 with a painted surface 68. Calibration target 66 has a reflectivity of about 80% to 85%, as measured by an X-Rite (tm) Model 938 spectrodensitometer. Referring to FIG. 3, calibration target 66 is held stationary within a recess 70 in registration frame 62. Stationary calibration target 66 has a thickness which is less than the depth (for example 4 mm) of recess 70. Accordingly, a gap 71 is defined between painted surface 68 and a stationary transparent platen glass 72. A side-one image module 74 is disposed beneath the surface formed by platen 72, registration frame 62 and a side-one platen glass 76 (FIG. 3).

Because there is no contact between painted surface 68 and the top surface 78 of platen 72, irregularities in optical density resulting from varying contact between a painted target surface and the top side of a platen glass are avoided, thus enabling successful calibration, as is more fully described below. However, gap 71 presents the possibility of airborne contamination by airborne dust, oil or other materials, small amounts of which could cause an inaccurate calibration. Accordingly, interfaces 80 are sealed with a suitable sealant disposed between the surface of the platen glass 72 and the primary surface of registration frame 62.

Figure 4:
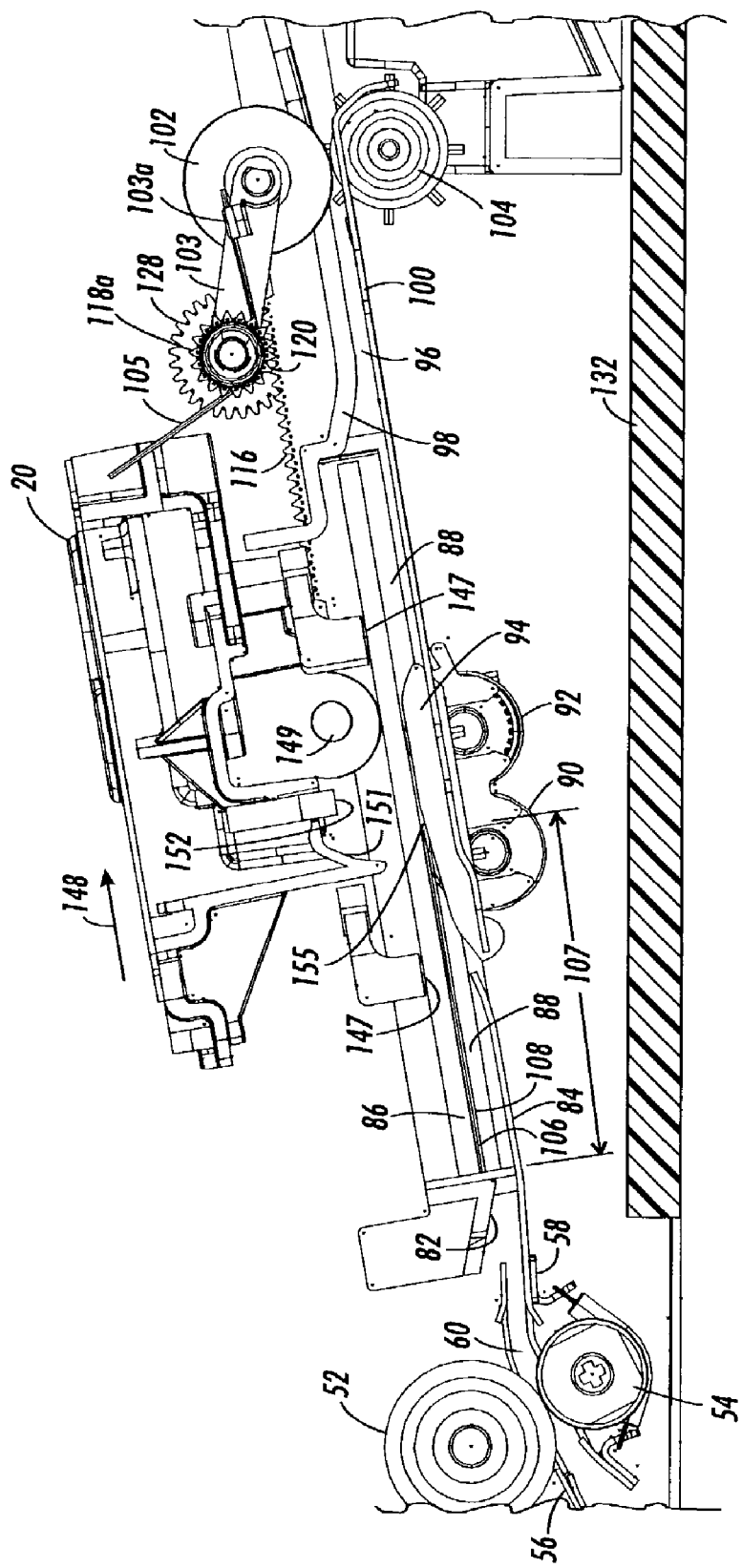
FIG. 4 is a detailed view of the side-two image module during scanning of an input image.

Referring to FIG. 4, downstream portions of paper path 60 are defined by a guide surface 82, which guides fed sheets between a lower guide member 84 and an upper guide member comprising side-two platen glass 86. Lower guide member 84 and side-two platen glass 86, together, define a document transport channel 88, which extends over a pair of constant velocity transport document advancing rollers 90 and 92. Rollers 90 and 92 are mounted within a drive on glass paper guide 94.

Documents traveling through transport channel 88 are guided into an output channel 96 defined between a guide surface 98 and transport bottom plate 100, where they are engaged by idler roller 102 and driven roller 104. Rollers 102 are mounted on arms 103. Arms 103 are biased by springs 105 to urge rollers 102 against rollers 104. Torsion spring 105 bears against a catch 103a at one of its ends and the body of imaging module 20 at its other end. Imaging module 20 is secured to assembly frame 15. Rollers 102 and 104 form another roller pair and output fully scanned documents into output tray 22.

Figure 5:
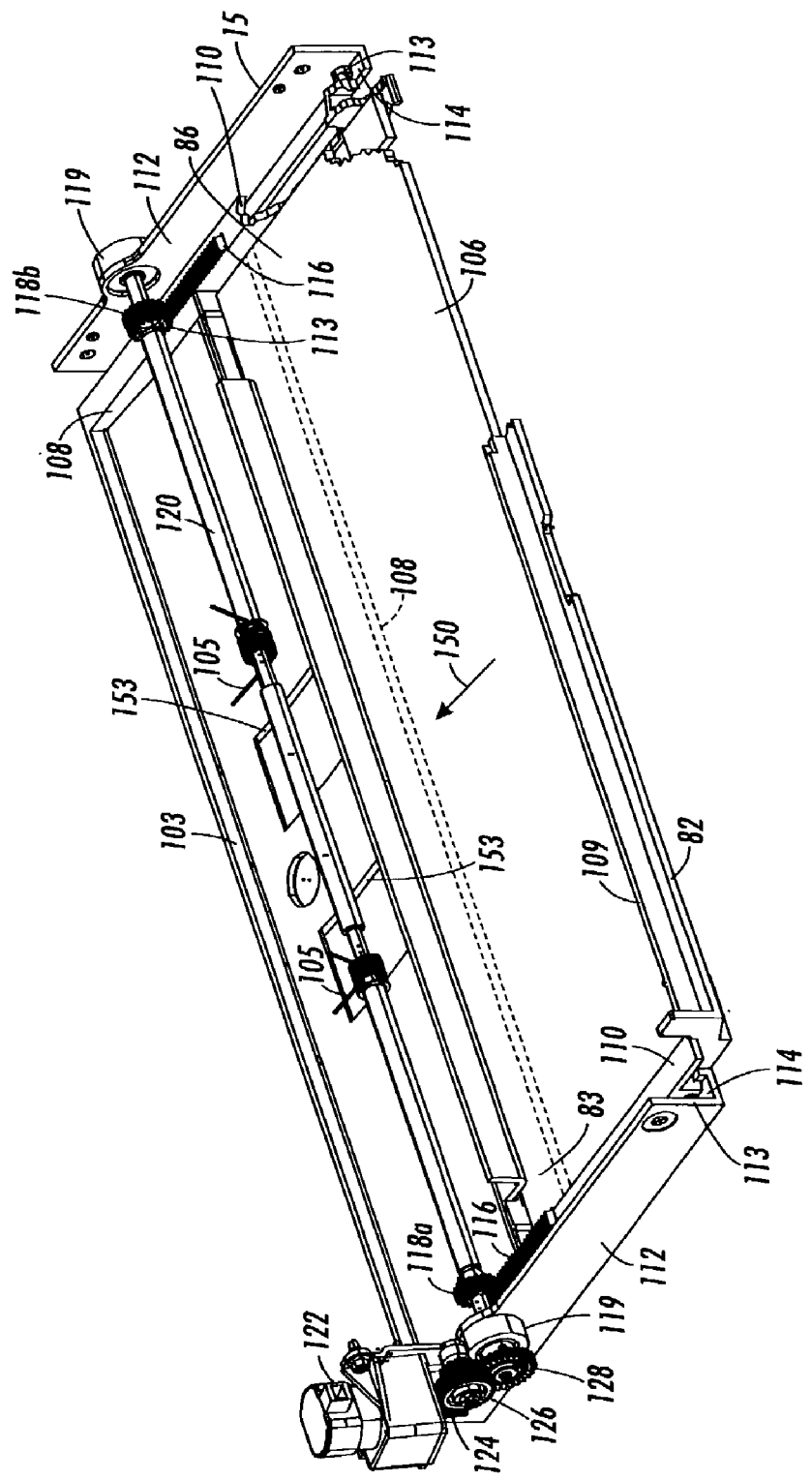
FIG. 5 is a perspective view of the side-two platen glass carrier in the image scanning position.

Referring to FIGS. 4 and 5, side-two platen glass 86 bears a painted calibration strip 106 (located in painted calibration portion 107), which is covered with a protective plastic coating 108 (which may be, for example, a polyethylene coating), which extends beyond the edge of painted calibration strip 106. Protective plastic coating 108 is desirable, as it protects calibration strip 106 from the abrasive effects of passing sheets as the sheets are passed through the inventive system.

Painted calibration strip 106 has a reflectivity of about 80 to 85% measured using an X-Rite 938 spectrodensitometer. Painted calibration strip 106 is painted on side-two platen glass 86, and thus provides a highly uniform calibration area which is very robust against dirt and wear. It is noted that the reflectivity of the painted calibration strip in the inventive system can vary widely with higher reflectivity being preferred. For example, target reflectivity in the range between 50 and 92 percent (92% is the reflectivity of the highest reflectivity paper commonly available) can be accommodated to the inventive system in accordance with known calibration techniques.

Side-two platen glass 86 is supported within a box 109. Box 109 is formed integrally with guide surfaces 82 and 98. Box 109 defines a pair of support wings 110. Wings 110 are supported by a pair of complementary track members 112. Wings 110 roll on track member 112 supported by four rollers 113 which act as wheels and thus reduce friction.

Complementary track members 112 are, in turn, supported within platen cover 14, being secured to assembly frame 15. Each of the support wings 110 rolls, supported by rollers 113, on its respective rail 114, each of which is formed integral with its respective track 112.

Wings 110 are formed with rack gears 116. Each rack gear 116 cooperates with its respective one of pinon gears 118a and 118b. Pinon gears 118a and 118b are, for cooperative synchronized motion, secured to and mounted on drive shaft 120, which is mounted for rotation between two bearings 119 in facing track members 112, as illustrated in FIG. 5. Facing track members 112 are fixedly secured to frame assembly 15. Drive shaft 120 is driven by a DC motor 122, which is coupled to drive shaft 120 by a gear train comprising three cooperating gears 124, 126 and 128. Pinon gears 118a and 118b are kept in contact with their respective rack gears 116 by being mounted on drive shaft 120, which, in turn, is mounted for rotation in bearings 119, which are integral with supported track members 112.

The operation of rack gears 116 and pinon gears 118a and 118b provide for a compact mechanism for enabling calibration of a document imaging system. More particularly, side-two platen glass 86 with the painted calibration strip 106 is moved into and out of the field of view of the image module 20 during a calibration cycle, as will be described in detail below.

The bottom of platen cover 14 is formed by a pressure pad 132. Pressure pad 132 serves the function of providing pressure on single documents while they are being copied.

When it is desired to input images of documents into the system, whether for copying, archiving or other purposes, one or more of the same are put into input tray 16 to form the stack of documents 26. Side one 134 of the top sheet 34 in the stack of documents 26 is in engagement with roller 30 after the documents have been input into input tray 16.

When copying begins, it is done one sheet at a time, with side one 134 being removed from the stack by rotation of roller 30. This feeds sheet 34 into paper path 60, where it is engaged by rollers 36 and 38, and then by rollers 40 and 42. As sheet 34 continues to be accelerated through paper path 60, its movement is continued next by roller pairs 44 and 44a and then by roller pairs 46 and 46a. This continues advancement of sheet 34 through paper path 60.

After engagement by roller 46, sheet 34 is engaged by a pair of rollers 48 and 50, which function as a constant velocity transport. Both rollers 48 and 50 are motor driven and very precisely control and maintain the desired constant speed of sheet 34. Such maintenance of uniform speed is important because variations in speed will result in magnification variations in the direction of feed. Rollers 48 and 50 push sheet 34 against the side-one platen glass 76. Sheet 34 slides over platen glass 76 in a so-called "drive on glass" arrangement.

Because paper path 60 is U-shaped, sheet 34 is inverted and side one 134 faces downwardly toward image module 74, when sheet 34 is under rollers 48 and 50. When sheet 34 is under rollers 48 and 50, side one 134 is illuminated by a light source 138, thus illuminating the linear area of information on side one 134. Light source 138 comprises a fluorescent lamp of conventional design and cooperates with a reflector 139, to send direct light rays 137 and reflected light rays 141 to the area on the document to be imaged. The illuminated linear area of information on side one 134 is imaged by a gradient indexed lens array 140 (FIG. 3). An appropriate lens would be a Selfoc brand lens made by Nippon Sheet Glass.

Gradient indexed lens array 140 is a part of image module 74 and performs the function of imaging the illuminated linear area on a linear array of photodiode or equivalent elements, which may be of conventional design (not illustrated). The photodiode or equivalent elements may typically take the form of a linear array of a single row of 5000 to 8000 photodiodes. Alternatively, multiple row detectors with two, three, or four rows of photodiodes, (for example, a 4 by 5000 detector array) may be used, because the lenses that form the lens array may image an area that is several pixels wide. Imaging is done on a one-to-one basis, that is, substantially without enlargement or magnification. The image detected by the photodiode elements is then downloaded as a linear area image, later to be combined with other linear area images to constitute a complete side-one image. More particularly, as sheet 34 is advanced over image module 74, image module 74 images successive linear areas and sends the same to memory so that a complete image of side one 134 of sheet 34 is obtained.

Before sheet 34 comes within the field of view of image module 74, the system performs a calibration of image module 74 by causing image module 74 to move (at a velocity of about 140 mm/sec) under a central portion of painted surface 68 of side one calibration target 66. Such velocity is not critical. Such movement is achieved by moving image module 74, from the position illustrated in FIG. 1, in the direction indicated by arrow 142, so that module 74 is imaging region 144 of painted surface 68 (FIG. 3), where several readings at several points along the path of movement of module 74 are taken for the purpose of calibration of image module 74. After this, the system is ready to image side one 134 of sheet 34.

Sheet 34, after imaging by image module 74, is deflected by guide surface 64 (FIG. 3) toward rollers 52 and 54. Rollers 52 and 54 cooperate to advance sheet 34 toward guide 82, which guides sheet 34 into document transport channel 88.

Figure 6:
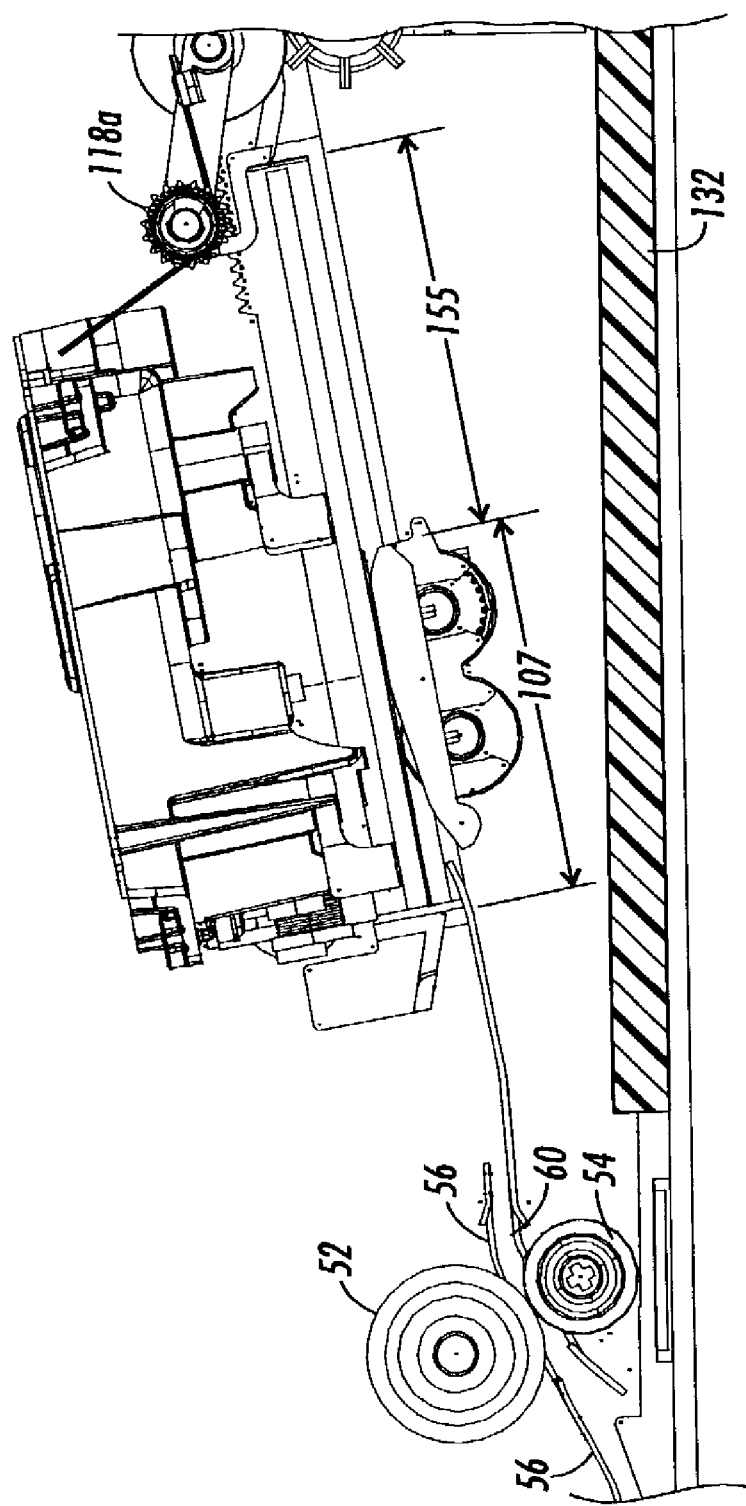
FIG. 6 is a view similar to FIG. 4, illustrating the side-two image module during a calibration operation.

Before sheet 34 comes within the field of view of side-two image module 20, a calibration sequence may be performed by advancing side-two platen glass 86 in the direction of arrow 148 (FIG. 4), from the position illustrated in FIG. 4 to the position illustrated in FIG. 6. The mechanics for achieving this may be understood with reference to FIG. 5.

More particularly, as illustrated in FIG. 5, when it is desired to perform a calibration sequence, motor 122 is actuated, causing the transmission of rotary motion through gears 124, 126 and 128 to drive shaft 120. Drive shaft 120 rotates, rotating pinon gears 118a and 118b. This causes the application of forces to rack gears 116, with the effect of causing movement in the direction of arrow 150. Because side two platen glass 86 is contained within box 109, movement of box 109, on rollers 113, in the direction of arrow 150 results in moving side two platen glass 86 in the direction of arrow 148 in FIG. 4 to the position illustrated in FIG. 6. During this movement, side two platen glass 86 slides on three low friction feet 147, only two of which are visible in FIG. 4, the third being hidden behind another of the other low friction feet 147, as indicated by dashed lines in the figure. Similar to the side one calibration operation, as this occurs, the central area of painted calibration strip 106 passes under side-two image module 20 and several readings are taken to calibrate the system. It is noted that guide surface 98 is an integral part of box 109. Rollers 102 and 104 are mounted to frame assembly 15 and remain in place, protruding through holes 153 and surface 98.

As noted above, painted calibration strip 106 extends across portion 107, which, in the document scanning position of platen glass 86, is out of the field of view of image module 20, as illustrated in FIG. 4. During calibration, portion 107 moves about 28 mm at a speed in the range of 40 mm/sec to 50 mm/sec, for example 42 mm/sec, to the position illustrated in FIG. 6, where multiple readings are taken to calibrate the system. Such velocity is not critical to the invention. After calibration has been accomplished, platen glass 86 returns to the imaging position illustrated in FIG. 4, and the system is ready to image side two of sheet 34. Such return to the imaging position illustrated in FIG. 4 is accomplished by driving motor 122 in the reverse direction.

Alternatively, motor 122 can operate against the biasing force of a spring during the calibration operation and power removed, or the gears disengaged, or other mechanical artifice employed after calibration is completed allowing the biasing spring to return the platen to the original position.

It is contemplated that when the system is instructed to image a stack of documents 26, both the side one and side two calibration subroutines will be implemented simultaneously, and that upon the completion of the calibration subroutines for image modules 20 and 74, roller 30 will initiate the feeding of sheets from the stack of documents 26.

Returning to the advancement of sheet 34 through the system, in document transport channel 88, rollers 90 and 92 press sheet 34 against side-two platen glass 86. Rollers 90 and 92 impart a constant velocity motion to sheet 34, as sheet 34 passes under side-two image module 20. Sheet 34 is illuminated on side two by a suitable light source 149, which cooperates with reflector 151. Side-two image module 20 performs the function of creating a side-two image on a linear area by linear area basis, in much the same manner that image module 74 creates a side-one image one linear area at a time. It is noted that modules 20 and 74 and associated light sources and focusing optics are substantially identical and function in the same way during imaging and calibration.

In particular, a gradient indexed lens array 152 images side two of sheet 34 through transport imaging portion 155 of platen glass 86, linear area by linear area as it passes under gradient indexed lens array 152, until the entire document is imaged. This information is sent to any suitable electronic memory where the image is available for printing, data processing, transmission by facsimile or any other purpose.

After the imaging of sheet 34 has been completed, the system continues to advance sheet 34 through the action of roller 104, which delivers the fully imaged sheet to output tray 22.

The inventive image input terminal may also be used to input images from books or from single sheets on a sheet-by-sheet, hand-fed basis. This is in contrast to the constant velocity mode of multiple-page automatic document image input described above. In particular, in the hand-fed or stationary document mode, after calibration, image module 74 is advanced to the position illustrated in FIG. 3, where the imaging point 154 of lens array 140 is at the edge of a document 156 to be imaged. Image module 74 then moves in the direction of arrow 158, until the entire area to be imaged has been covered. As image module 74 moves from, for example, the position illustrated in solid lines in FIG. 2 to the position illustrated in phantom lines in FIG. 2, the photodiode array associated with lens array 140 produces images of successive linear areas of the image printed on the underside 160 of document 156, until the entire image on the underside 160 of document 156 has been scanned and sent to memory. Calibration of image module 74 for stationary platen copying is performed in the same manner as calibration for the constant velocity transport scanning imaging process described above.

Once calibration of image module 74 has been completed, in the hand-fed mode, a sheet of paper or other object, such as a book 162, may be imaged. Preferably, this is done after platen cover 14 has been rotated to the down position (FIG. 1). This results in pressure pad 132 bearing against the sheet of paper, book or other object being imaged and applying pressure to insure a quality imaging operation.

The operation of movable platen system 1010, as illustrated in FIGS. 7–11, is similar to the operation of the system illustrated in FIGS. 1–6. To the extent practical, analogous parts in the embodiment of FIGS. 7–11 are given numbers one thousand higher than the corresponding parts in the embodiment illustrated in FIGS. 1–6.

Figure 7:
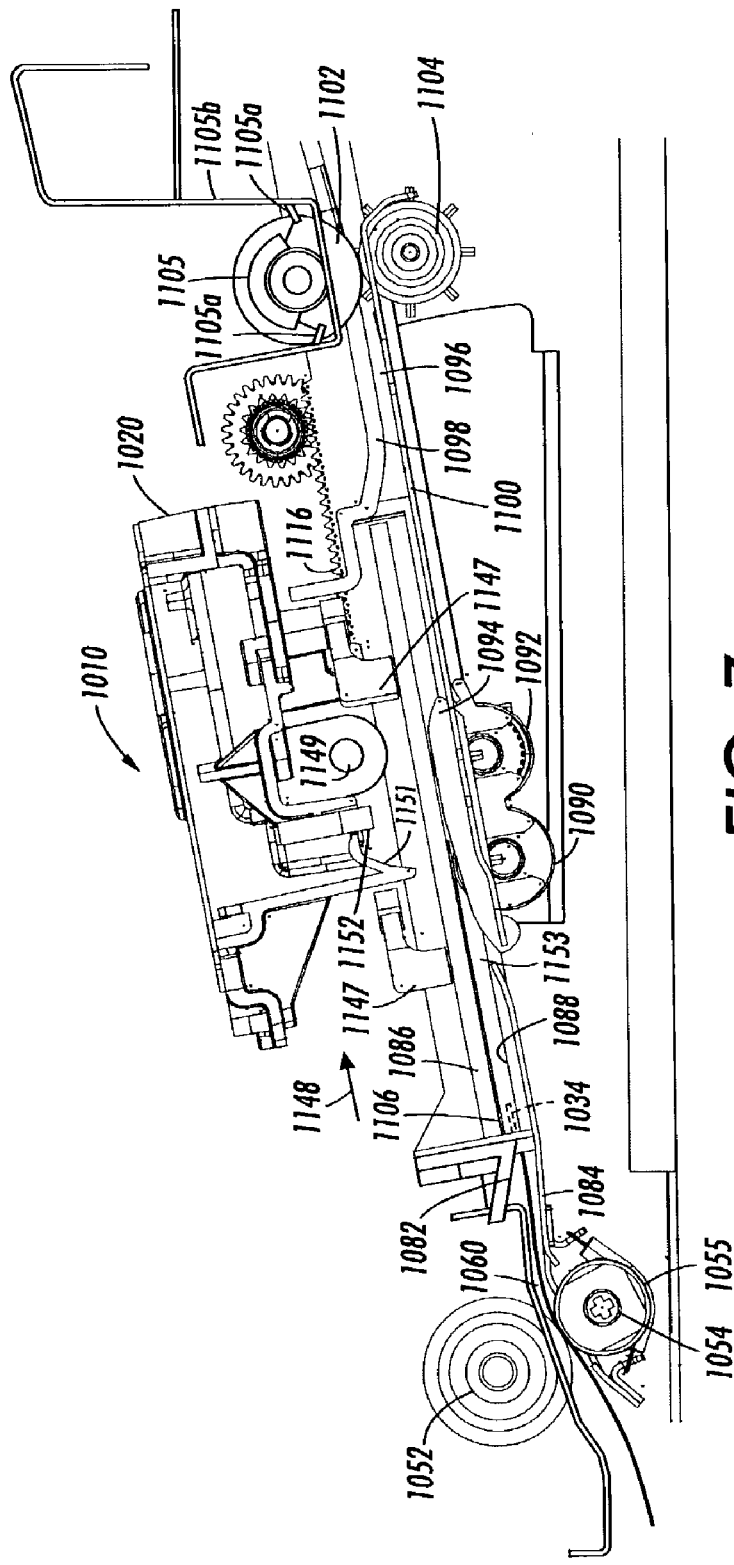
FIG. 7 is a detailed view, similar to FIG. 4, of an alternative side-two imaging subsystem during scanning of an input image.

Referring to FIG. 7, downstream portions of a paper path 1060 are defined by a guide surface 1082 which is an integral part of box 1109, which guides fed sheets (coming from roller pair 1052 and cooperating roller pair 1054) between a lower guide member 1084 and an upper guide member comprising side-two platen glass 1086. Roller pair 1054 is biased by spring 1055 toward roller pair 1052. Lower guide member 1084 and side-two platen glass 1086, together, define a document transport channel 1088, which extends over a pair of constant velocity transport document advancing rollers 1090 and 1092. Rollers 1090 and 1092 are mounted within a drive on glass paper guide 1094.

Figure 8:
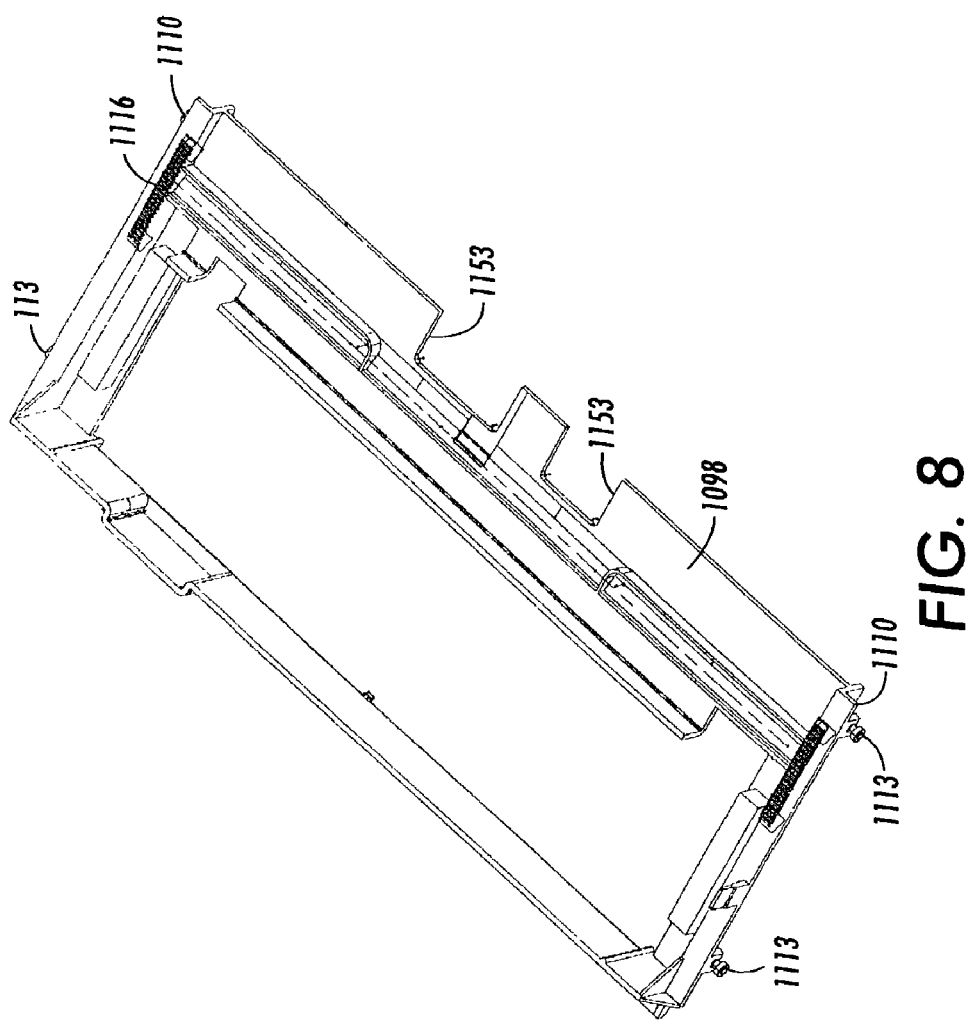
FIG. 8 is a perspective view of the side-two platen glass carrier in the alternative embodiment of FIG. 7.
Figure 9:
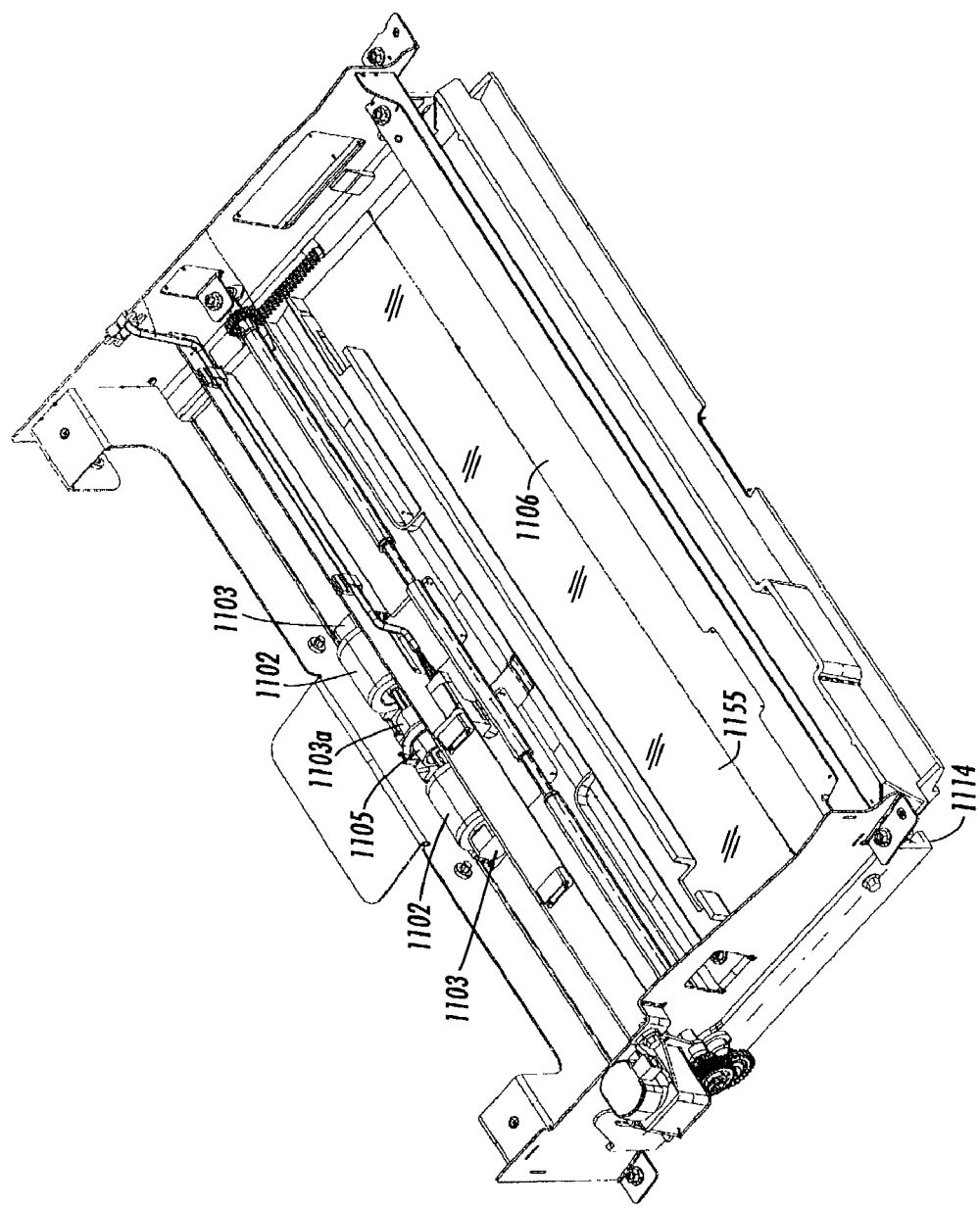
FIG. 9 is a perspective view, from the input end, of the side-two platen glass carrier and its supporting structure in the image scanning position in the alternative embodiment of FIG. 7.

Documents traveling through transport channel 1088 are guided into an output channel 1096 defined between a guide surface 1098 (FIG. 8) and transport bottom plate 1100, where they are engaged by idler rollers 1102 and driven rollers 1104. Rollers 1102 are mounted on bearings 1103, as illustrated in FIG. 9. Referring to FIG. 7, bearing 1103*a* is biased by coil spring 1105 to urge rollers 1102 against rollers 1104. Coil spring 1105 is tensioned between a pair of clips 1105*a*, on a support 1105*b*, one at each of its ends. Imaging module 1020 is secured to the assembly frame of the cover of the system. Rollers 1102 and 1104 form another roller pair and output fed documents into the output tray, not illustrated.

Referring to FIG. 7, side two platen glass 1086 bears a painted calibration strip 1106, which is covered with a protective plastic coating, which comprises an ultra high molecular weight polyethylene film member secured over painted calibration strip 1106 by a self-adhesive layer, acting to protect calibration strip 1106 from abrasion from passing sheets, as the sheets are passed through the inventive system.

Painted calibration strip 1106, which is painted on side-two platen glass 1086 provides a highly uniform calibration area which is very robust against dirt and wear. Painted calibration strip 1106 is formed using a high gloss opaque white paint such as Sherwin-Williams Hydralon Chemaqua white F82W582 with part B V66V580 catalyst.

Figure 10:
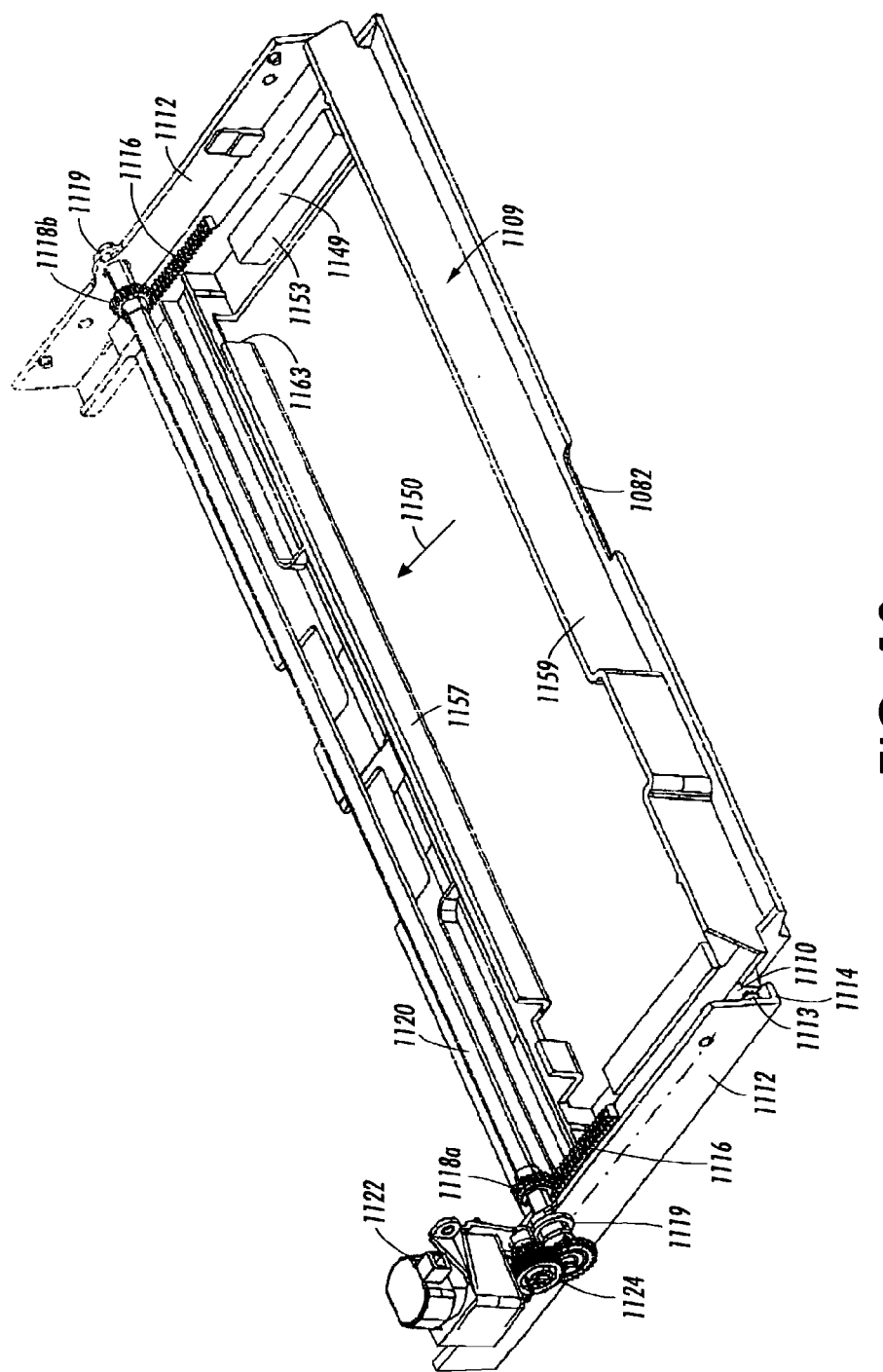
FIG. 10 is a perspective view of the side-two platen glass carrier and its supporting structure in the image scanning position in the alternative embodiment of FIG. 7.

Side-two platen glass 1086 is supported within a box 1109. Box 1109 is formed integrally with guide surface 1098. Box 1109 defines a pair of support wings 1110, as illustrated in FIG. 10. Wings 1110 are supported by a pair of complementary track members 1112. Wings 1110 roll on track members 1112 supported by four rollers 1113, which act as wheels and thus reduce friction. Complementary track members 1112 are, in turn, supported within the platen cover by being secured to the assembly frame. Each of the support wings 1110 rolls, supported by rollers 1113, on its respective rail 1114, each of which is formed integral with its respective track 1112.

Wings 1110 are formed with rack gears 1116. Each rack gear 1116 cooperates with its respective one of pinon gears 1118a and 1118b. Pinon gears 1118a and 1118b are, for cooperative synchronized motion, secured to and mounted on drive shaft 1120, which is mounted for rotation between two bearings 1119 in facing track members 1112, as illustrated in FIG. 10. Facing track members 1112 are fixedly secured to the frame assembly. Drive shaft 1120 is driven by a DC motor 1122 (FIG. 11), which is coupled to drive shaft 1120 by a gear train comprising a stationarily mounted gear train 1124. Pinon gears 1118a and 1118b are kept in contact with their respective rack gears 1116 by being mounted on drive shaft 1120, which, in turn is mounted for rotation in bearings 1119.

The operation of rack gears 1116 and pinon gears 1118a and 1118b provide for a compact mechanism for enabling calibration of a document imaging system. More particularly, side-two platen glass 1086 with painted calibration strip 1106 is moved into and out of the field of view of the imaging module 1020 during a calibration cycle, as will be described in detail below.

Figure 11:
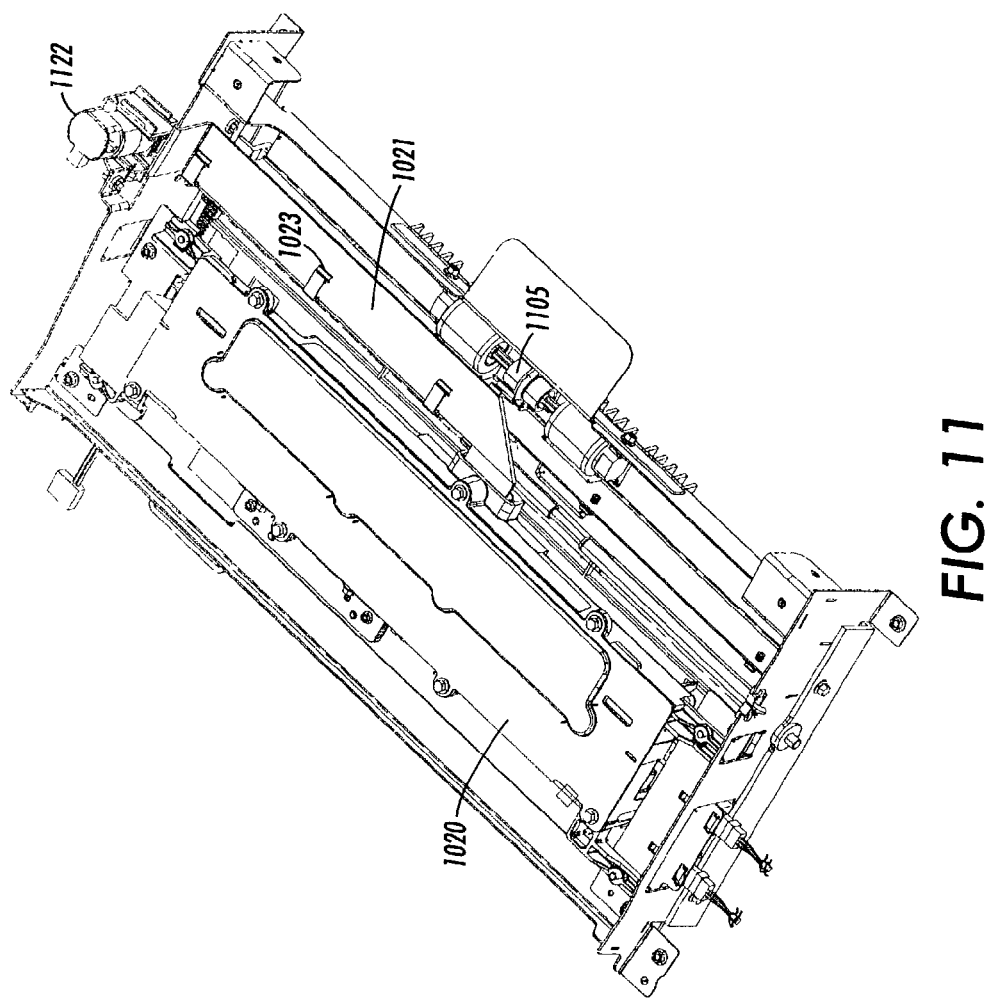
FIG. 11 is a perspective view, from the output end, of the side-two platen glass carrier and its supporting structure in the image scanning position in the alternative embodiment of FIG. 7.

Imaging module 1020 receives and/or transmits power, control information and output video along multiconductor ribbon cable 1021, which is kept in place by clips 1023, as illustrated in FIG. 11.

Before a sheet 1034 (FIG. 7), being advanced through the system, comes within the field of view of side-two image module 1020 (FIG. 11), a calibration sequence is performed by advancing side two platen glass 1086 in the direction of arrow 1148 (FIG. 7), from the position illustrated in FIG. 7, to a position analogous to that illustrated in FIG. 6. The mechanics for achieving this may be understood with reference to FIG. 10.

More particularly, as illustrated in FIG. 10, when it is desired to perform a calibration sequence, motor 1122 is actuated, causing the transmission of rotary motion through gear train 1124 to drive shaft 1120. Drive shaft 1120 rotates, rotating pinon gears 1118a and 1118b. This causes the application of forces to rack gears 1116, with the effect of causing movement in the direction of arrow 1150. Side-two platen glass 1086 is contained within box 1109, being supported by top surfaces 1149 of springy foam pads 1153, between airflow preventer 1157 (which reduces the accumulation of dirt deposits), and wall 1159. Box 1109 includes cutaway areas 1161 and 1163, which provide space for low friction feet 1147. Movement of box 1109, on rollers 1113, in the direction of arrow 1150 results in moving side-two platen glass 1086 in the direction of arrow 1148 in FIG. 7 to a position analogous to that illustrated in FIG. 6, in the above description of the previously described embodiment.

During this movement, side-two platen glass 1086 slides on three low friction feet 1147, only two of which are visible in FIG. 7, the third being hidden behind another one of the other low friction feet 1147, as indicated by dashed lines in FIG. 7. Low friction feet 1147 are made of acetal, such as that sold under the trademark Delrin. Similar to the side-one calibration operation, as this occurs, the central area of painted calibration strip 1106 passes under side-two image module 1020 and several readings are taken to calibrate the system. Rollers 1102 and rollers 1104 protrude through slots 1153 in surface 1098 as illustrated in FIG. 8.

As noted above, painted calibration strip 1106 in the document scanning position of platen glass 1086 is out of the field of view of image module 1020, which, instead is aimed at transparent document scanning area 1155. During calibration, calibration strip 1106 moves to a calibration position analogous to that illustrated in FIG. 6, where multiple readings are taken to calibrate the system. After calibration has been accomplished, platen glass 1086 returns to the imaging position illustrated in FIG. 7, and the system is ready to image side two of sheet 1034. Such return to the imaging position illustrated in FIG. 7 is accomplished by driving motor 1122 in the reverse direction.

As sheet 1034 advances through the system, in document transport channel 1088, rollers 1090 and 1092 press sheet 1034 against side-two platen glass 1086 and impart a constant velocity motion to sheet 1034, as sheet 1034, illuminated on side two by a suitable light source 1149, which cooperates with reflector 1151, passes under side-two image module 1020, which performs the function of creating a side-two image one linear area at a time.

A gradient indexed lens array 1152 images side two of sheet 1034, linear area by linear area as it passes under gradient indexed lens array 1152, until the entire document is imaged. This information is sent to any suitable electronic memory where the image is available for printing, data processing, transmission by facsimile or any other purpose.

After the imaging of sheet 1034 has been completed, the system continues to advance sheet 34 through the action of roller 1104, which delivers the fully imaged sheet to an output tray on the system.

It is, therefore, evident that there has been provided, in accordance with the present invention, an image input terminal that fully satisfies the aims and advantages hereinbefore set forth. While this invention has been described in conjunction with several embodiments thereof, it is evident that many alternatives, modifications and variations will be apparent to those skilled in the art. Accordingly, it is intended to embrace all such alternatives, modifications and variations as may fall within the spirit and broad scope of the appended claims.

The invention claimed is:

1. A system, comprising:
a movable platen with an imaging portion, said platen being configured to support a document;
a motor for moving said platen between a calibrating position and an imaging position;
a stationary imaging module having an imaging zone; and
a calibration member having a reference reflectivity, said calibration member being located on a calibration portion of said platen;
said stationary imaging module imaging an image on a medium, the image on the medium being located in said imaging zone of said stationary imaging module, when said platen is located at said imaging position;
said stationary imaging module being unable to image said calibration member, said calibration member being located substantially outside said imaging zone of said stationary imaging module, when said platen is located at said imaging position;
said stationary imaging module imaging said calibration member, said calibration member being located in said imaging zone of said stationary imaging module, when said platen is located at said calibrating position.

2. A system, comprising:
(a) a movably mounted support member;
(b) a platen defining an imaging portion and a calibration portion, said imaging portion and said calibration portion comprising separate portions of said platen, said platen supported by said support member, and moving with said support member between a platen calibrating position and a platen imaging position, said platen being dimensioned to support a sheet to be imaged;

(c) an imaging module having an imaging zone, said imaging module being supported in a position where said imaging zone is positioned to coincide with a portion of a sheet supported on said imaging portion of said platen when said platen is in said platen imaging position;

(d) a calibration member having a reference reflectivity adhered to said calibration portion of said platen, said calibration member lying substantially outside said imaging zone when said platen is in said platen imaging position; and (e) a motor coupled to said support member to move said support member between said calibrating position and said imaging position to allow performance of a calibration p procedure on said imaging module.

3. A system as in claim 2, wherein said calibration member comprises an opaque reflective film.

4. A system as in claim 2, wherein said calibration member comprises reflective paint covered by a layer of at least partially transparent film.

5. A system as in claim 2, wherein said movably mounted support member comprises a frame, said platen being secured to said frame, and said frame being supported by a guide rail mechanism for movement of said platen between said platen calibrating position and said platen imaging position.

6. A system as in claim 5, wherein said motor has an output shaft, said motor is mechanically coupled to said rail mechanism, and said output shaft is mechanically coupled to said frame.

7. A system as in claim 6, wherein said output shaft is mechanically coupled to said frame by a gear train comprising a rack gear and a pinion gear.

8. A system as in claim 7, wherein said rack gear is secured to said frame and is driven by rotation of said pinion gear to put said frame in positions where said platen is driven between said platen calibrating position and said platen imaging position.

9. A system as in claim 8, wherein said rail mechanism comprises a pair of rails.

10. A system as in claim 9, wherein said movably mounted support member comprises a frame, said platen being secured to said frame, and said frame being supported by a guide rail mechanism.

11. A system as in claim 10, wherein said imaging module is disposed over the top surface of said platen, to image the side of said sheet opposite the side of said sheet lying against the bottom surface of said platen and said calibration member is disposed over said bottom surface of said calibration member.

12. A system as in claim 10, wherein said guide rail mechanism comprises a pair of rails.

13. A system as in claim 2, wherein said imaging module is disposed over the top surface of said platen, to image the side of said sheet opposite the side of said sheet lying against the bottom surface of said platen and said calibration member is disposed over said bottom surface of said calibration member.

14. An imaging system, comprising:

(a) an input tray for holding one or more documents in a stack to be imaged, each of said documents being disposed with its side one facing upwardly and its side two facing downwardly;

(b) a U-shaped baffle positioned to receive the output of said input tray and guide one of said documents downwardly;

(c) a feed roller for pulling said documents from said stack, one at a time, and feeding them into said baffle;

(d) at least one roller for advancing said documents at a constant velocity through a side one imaging region;

(e) a side one imaging module for forming a side-one image, said side-one imaging module imaging that portion of said document in said side one imaging region;

(f) a movably mounted support member;

(g) a platen defining an imaging portion and a calibration portion, said imaging portion and said calibration portion comprising separate portions of said platen, said platen supported by said support member, and moving with said support member between a platen calibrating position and a platen imaging position, said platen being dimensioned to support a sheet to be imaged;

(h) a side-two imaging module having a side two imaging zone, said side-two imaging module being supported in a position where said side-two imaging zone is positioned to coincide with a portion of a sheet supported on said imaging portion of said platen when said platen is in said platen imaging position;

(i) an output baffle for guiding a document being imaged between said platen and said side two imaging module;

(j) a calibration member having a reference reflectivity adhered to said calibration portion of said platen, said calibration member lying substantially outside said imaging zone when said platen is in said platen imaging position; and (k) a motor for moving said support member between said calibrating position and said side two imaging position to allow performance of a calibration procedure on said imaging module.

15. An imaging system as in claim 14, wherein said movably mounted support member comprises a frame, said platen being secured to said frame, and said frame being supported by a guide rail mechanism for movement of said platen between said platen calibrating position and said platen imaging position.

16. An imaging system as in claim 15, wherein said motor has an output shaft, said motor is mechanically coupled to said rail mechanism, and said output shaft is mechanically coupled to said frame by a gear train comprising a rack gear and a pinion gear, said rack gear being secured to said frame and driven by rotation of said pinion gear to put said frame in positions where said platen is driven between said platen calibrating position and said platen imaging position.

17. An imaging system as in claim 16, wherein said side-two imaging module is disposed over the top surface of said platen, to image side two of said sheet.

18. A method of imaging sheets comprising:

(a) moving, between a first imaging position and a second calibration position, a platen with a calibration element secured to the platen;

(b) imaging the calibration element with a stationary imaging array when the platen is located at the calibration position;

(c) performing a calibration operation when the platen is located at the calibration position;

(d) moving the platen to the imaging position such that the calibration element is located substantially outside an imaging area of the stationary imaging array;

(e) advancing sheets to be imaged to the imaging area of the stationary imaging array when the platen is located at the imaging position; and (f) imaging, when the platen is located at the imaging position, the advancing sheets as the advancing sheets pass through the imaging area of the stationary imaging array without imaging the calibration element.

* * * * *